United States Patent
Pan et al.

(10) Patent No.: US 7,688,796 B2
(45) Date of Patent: Mar. 30, 2010

(54) WIRELESS COMMUNICATION METHOD AND APPARATUS FOR DECODING ENHANCED DEDICATED CHANNEL ABSOLUTE GRANT CHANNEL TRANSMISSIONS

(75) Inventors: Jung-Lin Pan, Selden, NY (US); Sung-Hyuk Shin, Northvale, NJ (US); Rui Yang, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 758 days.

(21) Appl. No.: 11/478,395

(22) Filed: Jun. 28, 2006

(65) Prior Publication Data

US 2007/0061673 A1    Mar. 15, 2007

Related U.S. Application Data

(60) Provisional application No. 60/713,140, filed on Aug. 31, 2005.

(51) Int. Cl.
  H04B 7/216 (2006.01)
  G06F 11/00 (2006.01)
(52) U.S. Cl. ............. 370/342; 370/335; 370/312; 370/313; 370/314; 370/310; 714/3; 714/758; 714/776
(58) Field of Classification Search ............ 370/338, 370/328, 342, 318, 311, 332, 335, 320
See application file for complete search history.

(56) References Cited

U.S. PATENT DOCUMENTS

| 2002/0170013 | A1 | 11/2002 | Bolourchi |
| 2005/0286654 | A1* | 12/2005 | Tanrikulu et al. ......... 375/316 |
| 2006/0114877 | A1* | 6/2006 | Heo et al. ................. 370/342 |
| 2006/0156184 | A1* | 7/2006 | Kim et al. ................ 714/758 |
| 2009/0036139 | A1* | 2/2009 | Usuda et al. ............. 455/450 |

FOREIGN PATENT DOCUMENTS

WO    03049308    6/2003

OTHER PUBLICATIONS

ETSI, Universal Mobile Telecommunications System (UMTS); Multiplexing and Channel Coding (FDD) (3GPP TS 25.212 version 6.4.0 Release 6), ETSI TS 125 212 V6.4.0, (Mar. 2005).
ETSI, Universal Mobile Telecommunications System (UMTS); Multiplexing and Channel Coding (FDD) (3GPP TS 25.212 version 6.7.0 Release 6), ETSI TS 125 212 V6.7.0, (Dec. 2005).

* cited by examiner

*Primary Examiner*—Huy Q Phan
(74) *Attorney, Agent, or Firm*—Volpe and Koenig, P.C.

(57) ABSTRACT

A wireless communication method and apparatus for decoding enhanced dedicated channel (E-DCH) absolute grant channel (E-AGCH) transmissions are disclosed. A wireless transmit/receive unit (WTRU) receives E-AGCH data which includes a cyclic redundancy check (CRC) part and a data part. The CRC part is masked with a WTRU identity (ID) at a Node-B. The CRC part and the data part are demultiplexed and the CRC part is demasked with the WTRU ID. A CRC is then performed with the demasked CRC part. If the CRC passes the data part is sent to an enhanced uplink medium access control (MAC-e) entity. The WTRU ID may be a primary E-DCH radio network temporary identity (E-RNTI) or a secondary E-RNTI. When the E-AGCH data is transmitted over a 10 ms frame, if the CRC fails, E-AGCH data via subsequent subframe may be soft combined with the previous E-AGCH data.

29 Claims, 3 Drawing Sheets

US 7,688,796 B2

WIRELESS COMMUNICATION METHOD AND APPARATUS FOR DECODING ENHANCED DEDICATED CHANNEL ABSOLUTE GRANT CHANNEL TRANSMISSIONS

CROSS REFERENCE TO RELATED APPLICATION

This application claims the benefit of U.S. Provisional Application No. 60/713,140 filed Aug. 31, 2005, which is incorporated by reference as if fully set forth.

FIELD OF INVENTION

The present invention is related to a wireless communication system including a wireless transmit/receive unit (WTRU) and a Node-B. More particularly, the present invention is related to a wireless communication method and apparatus for decoding enhanced dedicated channel (E-DCH) absolute grant channel (E-AGCH) transmissions.

BACKGROUND

Enhanced uplink (EU) is one of the major features in third generation partnership project (3GPP) frequency division duplex (FDD) systems. EU offers a peak data rate of 5.76 Mbps. Several downlink physical channels are provided to support EU transmissions. One of the downlink channels is the E-AGCH.

FIG. 1 is a block diagram of a conventional wireless communication system 100 which supports EU. The system 100 includes a WTRU 102, a Node-B 104 and a radio network controller (RNC) 106. The RNC 106 controls overall E-DCH operation by configuring E-DCH parameters for the Node-B 104 and the WTRU 102, such as an initial transmit power level, maximum allowed transmit power or available channel resources per Node-B. Between the WTRU 102 and the Node-B 104, an E-DCH 108, an E-DCH dedicated physical control channel (E-DPCCH) 110, an E-AGCH 112, an E-DCH relative grant channel (E-RGCH) 114 and an E-DCH hybrid automatic repeat request (H-ARQ) indicator channel (E-HICH) 116 are established for supporting E-DCH operations.

For E-DCH transmissions, the WTRU 102 sends scheduling requests, (also known as rate requests), for the logical channels which a radio resource control (RRC) determines that reporting is needed to be made to the Node-B 104 via the E-DCH 108. The scheduling requests are transmitted in the form of scheduling information and happy bit. The happy bit is transmitted via the E-DPCCH 110 whenever the E-DPCCH 110 is transmitted. The Node-B 104 sends a scheduling grant to the WTRU 102 via the E-AGCH 112 or the E-RGCH 114. After E-DCH radio resources are allocated for the WTRU 102, the WTRU 102 transmits data via the E-DCH 108. In response to the E-DCH transmissions, the Node-B 104 sends an acknowledgement (ACK) or a non-acknowledgement (NACK) message for H-ARQ operation via the E-HICH 116.

The E-AGCH 112 is a very important channel for performing fast scheduling in the EU. The E-AGCH 112 carries the scheduling grant in the form of a maximum power ratio for the WTRU 102. The maximum power ratio is given by the power ratio of the E-DCH dedicated physical data channel (E-DPDCH) over the dedicated physical control channel (DPCCH) (not shown in FIG. 1). In addition, the E-AGCH 112 also carries an activation flag that is used to activate or deactivate H-ARQ processes, indicating activation or deactivation of either single or all H-ARQ processes.

The E-AGCH 112 is transmitted with an E-DCH radio network temporary identifier (E-RNTI). Under the current 3GPP standards, two E-RNTIs may be configured for the WTRU 102 at a time. One is a primary E-RNTI and the other is a secondary E-RNTI. Only one E-RNTI may be transmitted at a time. The WTRU 102 should monitor both E-RNTIs if configured. Decoding of the E-AGCH 112 has to be performed for both E-RNTIs if configured. The success or failure of the decoding of the E-AGCH 112 significantly affects the performance of the EU. Therefore, it is desirable to provide a reliable method for decoding the E-AGCH 112.

SUMMARY

The present invention is related to a wireless communication method and apparatus for decoding E-AGCH transmissions. A WTRU receives E-AGCH data which includes a cyclic redundancy check (CRC) part and a data part. The CRC part is masked with a WTRU identity (ID) at a Node-B. The CRC part and the data part are demultiplexed and the CRC part is demasked with the WTRU ID. A CRC is then performed with the demasked CRC part. If the CRC passes, the data part is sent to an EU medium access control (MAC-e) entity. The WTRU ID may be a primary E-RNTI or a secondary E-RNTI. When the E-AGCH data is transmitted over a 10 ms frame, if the CRC fails, E-AGCH data via subsequent subframe may be soft combined with the previous E-AGCH data.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components. The present invention may be implemented in the form of an application specific integrated circuit (ASIC) and/or digital signal processing (DSP), as software or hardware.

Figure 1:
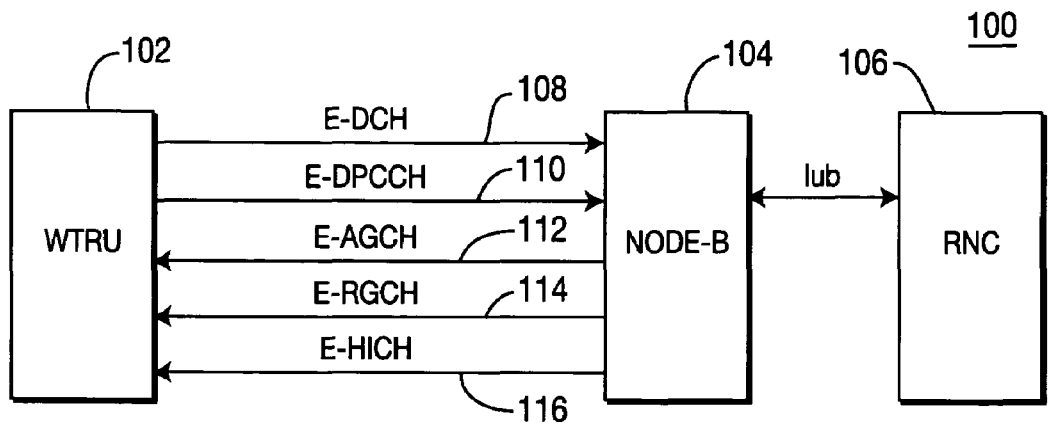
FIG. 1 is a block diagram of a conventional wireless communication system.
Figure 2:
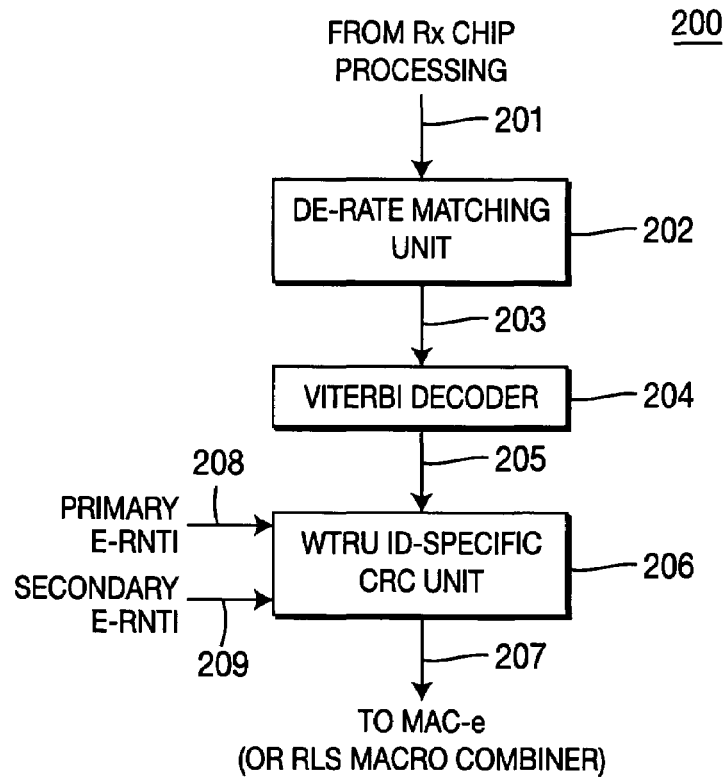
FIG. 2 is a block diagram of a decoding chain of a WTRU for decoding an E-AGCH after receive chip rate processing is performed in accordance with the present invention.

FIG. 2 is a block diagram of a decoding chain 200 of a WTRU for decoding an E-AGCH after receive chip rate processing is performed in accordance with the present invention. The decoding chain 200 includes a de-rate matching unit 202, a Viterbi decoder 204 and a WTRU ID-specific CRC unit 206. An input sequence 201 recovered by a receive chip rate processor (not shown) is sent to the de-rate matching unit 202. The input sequence 201 is a sequence of soft bits in an E-AGCH subframe obtained after a receive chip rate processing is performed. The decoding chain 200 operates on a subframe basis, (i.e., 2 ms).

The de-rate matching unit 202 performs de-rate matching on the input sequence 201 to obtain a de-rate matched sequence 203. The de-rate matching is an inverse process of the rate matching process which is performed in a Node-B. The de-rate matched sequence 203 is sent to the Viterbi decoder 204 for convolutional decoding, resulting in a bit sequence 205. The bit sequence 205 is sent to the WTRU ID-specific CRC unit 206 for performing CRC(s).

The bit sequence 205 includes a data part, (i.e., the absolute grant information), and a CRC part. At the Node-B, a 16-bit CRC is attached to the data part and the CRC is masked with one of the two WTRU IDs, (i.e., a primary E-RNTI 208 or a secondary E-RNTI 209). The masking is performed by a modular-2 addition of the CRC part and the WTRU ID. The WTRU does not know which ID has been used to mask the CRC part. Therefore, the WTRU ID-specific CRC unit 206 performs a CRC with either the primary E-RNTI 208 or the secondary E-RNTI 209 for each received E-AGCH transmission. If the CRC passes, the data part is sent to a MAC-e entity (not shown), (or to a radio link set (RLS) macro combiner for macro combining). If the CRC fails, the data part may be discarded or stored in a memory to be combined with a subsequent transmission.

Figure 3:
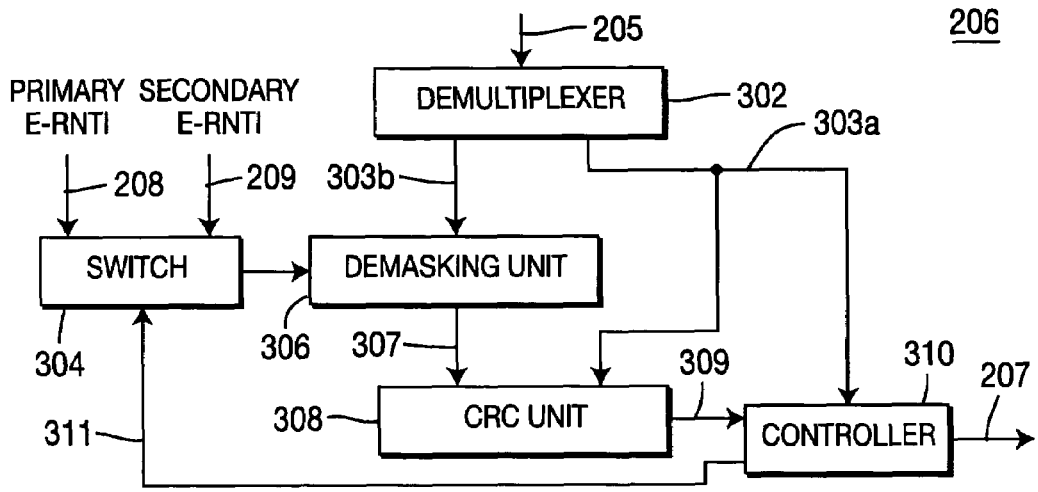
FIG. 3 is a block diagram of a WTRU ID-specific CRC unit in the decoding chain of FIG. 2.

FIG. 3 is a block diagram of the WTRU ID-specific CRC unit 206 of the decoding chain 200 of FIG. 2. The WTRU ID-specific CRC unit 206 includes a demultiplexer 302, a switch 304, a demasking unit 306, a CRC unit 308 and a controller 310. The bit sequence 205 is sent to the demultiplexer 302. As stated above, the bit sequence 205 includes a data part 303a and a CRC part 303b. The data part 303a and the CRC part 303b is demultiplexed by the demultiplexer 302 so that the CRC part 303b is sent to the demasking unit 306 and the data part 303a is sent to the CRC unit 308 and the controller 310. The demasking unit 306 performs demasking on the CRC part 303b with one of the WTRU ID, (i.e., the primary E-RNTI 208 or the secondary E-RNTI 209). The primary E-RNTI 208 or the secondary E-RNTI 209 is sent to the demasking unit 306 via the switch 304 under the control of the controller 310.

The demasked CRC part 307 is sent to the CRC unit 308. The CRC unit 308 performs a CRC with the data part 303a and the demasked CRC part 307 and sends a pass/fail signal 309 to the controller 310. If the CRC passes, the controller 310 sends the data part 303a to the MAC-e entity (not shown), (or to an RLS macro combiner). If the CRC fails, the controller 310 sends a control signal 311 to the switch 304 to switch the WTRU ID so that the demasking unit 306 demasks the CRC part 303a with the other WTRU ID and a second CRC is performed by the CRC unit 308 with a demasked CRC part 307, (demasked with the other WTRU ID), and the data part 303a. If the second CRC also fails, the data part 303a may be discarded.

Since the WTRU does not know which WTRU ID was used for masking at the Node-B, the WTRU needs to check for either the primary E-RNTI 208 or the secondary E-RNTI 209. Initially, the WTRU may start with the primary E-RNTI 208. Alternatively, the WTRU may use the one with which the CRC passes in the last successful decoding of the E-AGCH 112.

Figure 4:
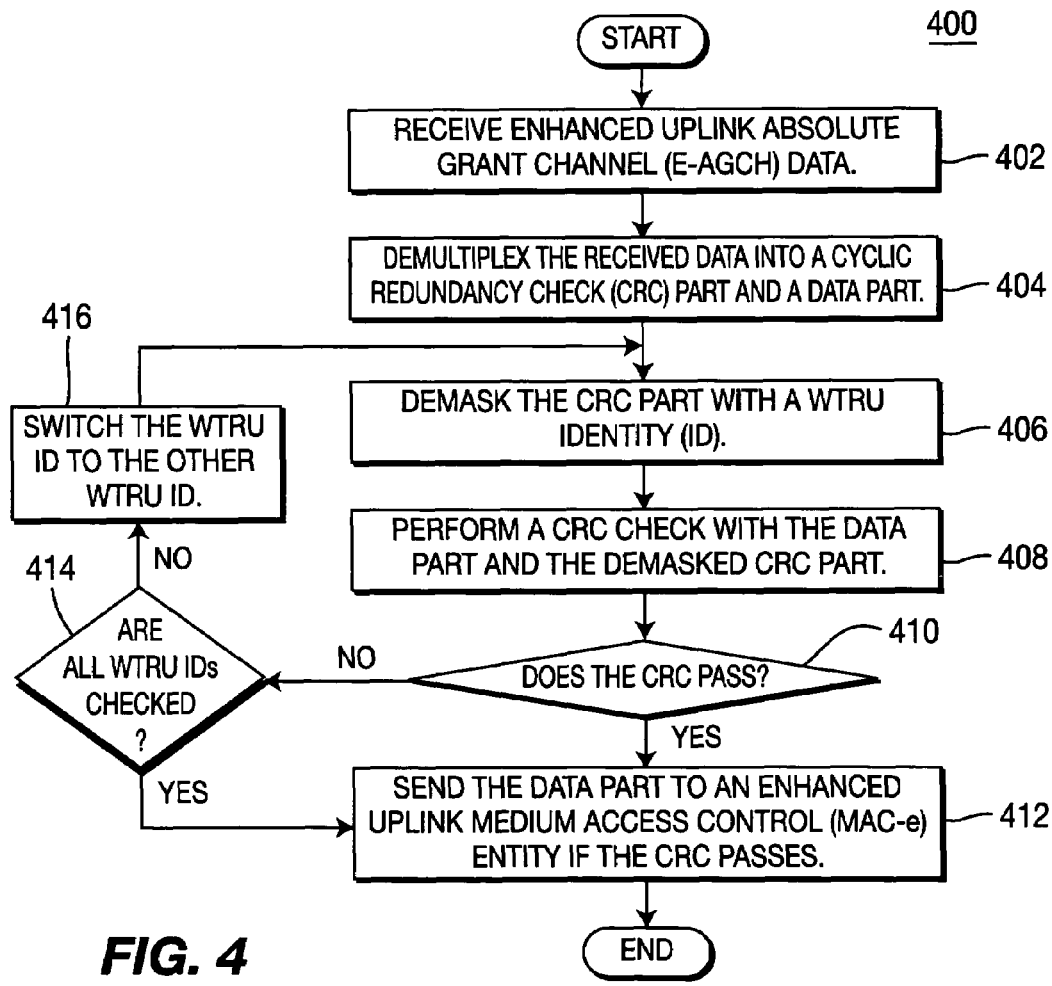
FIG. 4 is a flow diagram of a process for E-AGCH decoding in accordance with one embodiment of the present invention.

FIG. 4 is a flow diagram of a process 400 for decoding an E-AGCH 112 in accordance with one embodiment of the present invention. E-AGCH data is received (step 402). The received E-AGCH data is demultiplexed into a CRC part and a data part (step 404). The CRC part is demasked with a WTRU ID (step 406). A CRC is performed with the data part and the demasked CRC part (step 408). It is then determined whether the CRC passes (step 410). If the CRC passes, the data part is sent to the MAC-e entity (step 412). If the CRC fails, it is determined whether all WTRU IDs have been checked (step 414). If so, the process 400 ends. If not, the WTRU ID is switched to the other WTRU ID (step 416) and the process 400 returns to step 406.

Under the current 3GPP standards, the absolute grant information is transmitted over either one E-AGCH subframe (2 ms) or one E-AGCH frame (10 ms) depending on the E-DCH transmission time interval (TTI). When the E-DCH TTI is equal to 10 ms, the absolute grant information for the WTRU is repeated in all the E-AGCH 2 ms subframes in the same 10 ms frame such that the same sequence of E-AGCH bits (60 bits per subframe) is repeated over all the 2 ms subframes in the same 10 ms frame.

If the WTRU successfully decodes (no CRC error) the data received in an E-AGCH subframe j, then the data part is delivered to the MAC-e entity and the process stops (in order for the WTRU to avoid unnecessary processing). However, if the WTRU fails to decode the E-AGCH data for both WTRU IDs, the WTRU then has the following two options.

In accordance with the first option, the WTRU may decode E-AGCH data in each 2 ms subframe independently. An erroneous E-AGCH data in subframe j is discarded and the WTRU freshly processes the E-AGCH data received in a subframe j+1 of the same 10 ms radio frame as described hereinbefore.

In accordance with the second option, the WTRU may soft combine the E-AGCH data received in the previous 2 ms subframes and in the current 2 ms subframe of the 10 ms same radio frame. Because the same sequence of absolute grant data is transmitted over all the 2 ms subframes of the same E-AGCH frame for the 10 ms E-DCH TTI, the WTRU may perform soft combining (bit-by-bit combining before decoding) of the sequence of the E-AGCH bits received in 2 ms subframe j+1 with the sequence(s) received in the previous E-AGCH 2 ms subframe(s) of the same 10 ms radio frame, where j=1, 2, 3, 4. Optionally, weighting factors may be applied to the individual 2 ms subframes. The weighting factor may be determined as a function of a signal-to-interference ratio (SIR) of the E-AGCH in the corresponding 2 ms subframe.

Figure 5:
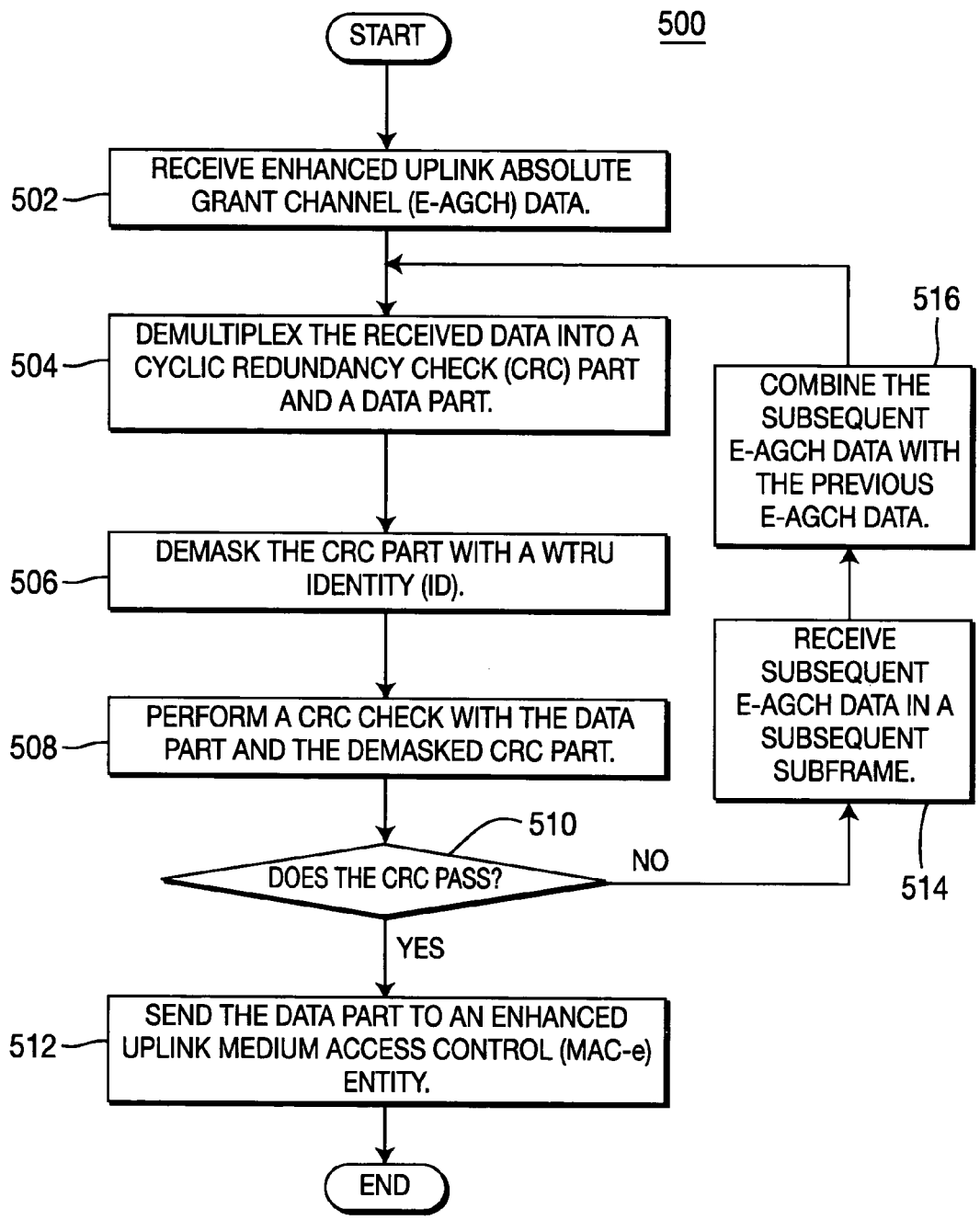
FIG. 5 is a flow diagram of a process for E-AGCH decoding in accordance with another embodiment of the present invention.

FIG. 5 is a flow diagram of a process 500 for E-AGCH decoding in accordance with another embodiment of the present invention. E-AGCH data is received (step 502). The received E-AGCH data is demultiplexed into a CRC part and a data part (step 504). The CRC part is demasked with a WTRU ID (step 506). A CRC is performed with the data part and the demasked CRC part (step 508). It is then determined whether the CRC passes or fails (step 510). If the CRC passes, the data part is sent to the MAC-e entity (step 512). The CRC process may be performed with two WTRU IDs so that if the CRC fails with one WTRU ID, the same process is repeated with the other WTRU ID, as explained hereinbefore. If the CRC fails with all WTRU IDs, subsequent E-AGCH data is received in a subsequent subframe (step 514). The subsequent E-AGCH data may be soft combined with the data received in the previous subframe (step 516). The process 500 then returns to step 504.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of decoding enhanced dedicated channel (E-DCH) absolute grant channel E-AGCH transmissions, the method comprising:
    receiving E-AGCH data via the E-AGCH, the E-AGCH data including a cyclic redundancy check (CRC) part and a data part, the CRC part being masked with a wireless transmit/receive unit (WTRU) identity (ID) at a Node-B;
    demultiplexing the received E-AGCH data into the CRC part and the data part;
    demasking the CRC part with the WTRU ID;
    performing a CRC with the data part and the demasked CRC part; and
    sending the data part to an enhanced uplink medium access control (MAC-e) entity on a condition that the CRC passes.

2. The method of claim 1 wherein the WTRU ID is an E-DCH radio network temporary ID (E-RNTI).

3. The method of claim 2 wherein the WTRU ID is one of a primary E-RNTI or a secondary E-RNTI.

4. The method of claim 3 further comprising:
    switching the WTRU ID on a condition that the CRC fails; and
    repeating the demultiplexing, the demasking, the performing, and the sending.

5. The method of claim 4 wherein the CRC is performed with the primary E-RNTI first.

6. The method of claim 4 wherein the CRC is performed with the E-RNTI with which a CRC passed for previous E-AGCH data.

7. The method of claim 1 wherein a rate grant is received via the E-AGCH in a 2 ms subframe.

8. The method of claim 1 wherein a rate grant is received via the E-AGCH in a 10 ms frame which comprises five 2 ms subframes.

9. The method of claim 8 wherein the rate grant is repeated five times for the 10 ms frame.

10. The method of claim 9 further comprising:
    on a condition that the CRC fails, receiving subsequent E-AGCH data in a subsequent subframe;
    soft combining the subsequent E-AGCH data with the E-AGCH data received in a previous subframe; and
    repeating the demultiplexing, the demasking, the performing, the sending, the receiving, and the soft combining until the CRC passes.

11. The method of claim 10 further comprising:
    multiplying a weighting factor to the subsequent E-AGCH data.

12. The method of claim 11 further comprising:
    estimating a signal-to-noise ratio (SNR) on the subsequent subframe, whereby the weighting factor is determined based on the SNR.

13. The method of claim 1 wherein the CRC part and the WTRU ID are each 16 bits long.

14. The method of claim 1 further comprising:
    performing a radio link set (RLS) macro combining of the data part on a condition that the CRC passes.

15. A wireless transmit/receive unit (WTRU) for decoding transmissions received from a Node-B via an enhanced dedicated channel (E-DCH) absolute grant channel (E-AGCH), the WTRU comprising:
    a receiver for receiving E-AGCH data via the E-AGCH, the E-AGCH data including a cyclic redundancy check (CRC) part and a data part, the CRC part being masked with a WTRU identity (ID) by the Node-B;
    a demultiplexer for demultiplexing the received E-AGCH data into the CRC part and the data part;
    a demasking unit for demasking the CRC part with the WTRU ID;
    a CRC unit for performing a CRC on the data part with the demasked CRC part; and
    a controller configured to send the data part to an enhanced uplink medium access control (MAC-e) entity on a condition that the CRC passes.

16. The WTRU of claim 15 wherein the WTRU ID is an E-DCH radio network temporary ID (E-RNTI).

17. The WTRU of claim 16 wherein the WTRU ID is one of a primary E-RNTI or a secondary E-RNTI.

18. The WTRU of claim 17 further comprising:
    a switch for switching the E-RNTI between the primary E-RNTI and the secondary E-RNTI, whereby the demasking unit demasks the CRC part with the switched E-RNTI on a condition that the CRC fails with one of the primary E-RNTI or the secondary E-RNTI.

19. The WTRU of claim 18 wherein the CRC unit performs the CRC with the primary E-RNTI first.

20. The WTRU of claim 18 wherein the CRC unit performs the CRC with the E-RNTI with which a CRC passed for previous E-AGCH data.

21. The WTRU of claim 15 wherein a rate grant is received via the E-AGCH in a 2 ms subframe.

22. The WTRU of claim 15 wherein a rate grant is received via the E-AGCH in a 10 ms frame which comprises five 2 ms subframes.

23. The WTRU of claim 22 wherein the rate grant is repeated five times for the 10 ms frame.

24. The WTRU of claim 23 further comprising:
    a soft combiner for soft combining the subsequent E-AGCH data with the E-AGCH data received in a previous subframe, whereby on a condition that the CRC fails, the receiver receives subsequent E-AGCH data in a subsequent subframe and combined E-AGCH data is demultiplexed by the demultiplexer.

25. The WTRU of claim 24 further comprising:
    a weighting factor generator for generating a weighting factor; and
    a multiplier for multiplying the weighting factor to the subsequent E-AGCH data.

26. The WTRU of claim 25 further comprising:
    a signal-to-noise ratio (SNR) estimator for estimating an SNR on the subsequent subframe, whereby the weighting factor generator generates the weighting factor based on the SNR.

27. The WTRU of claim 15 wherein the CRC part and the WTRU ID are each 16 bits long.

28. The WTRU of claim 15 further comprising a radio link set (RLS) macro combiner for performing macro combining of the data part.

29. An integrated circuit (IC) comprising the receiver, the demultiplexer, the demasking unit, the CRC unit and the controller of the WTRU of claim 15.

\* \* \* \* \*